D. H. BENJAMIN.
APPARATUS FOR HANDLING STARCH MIXTURE.
APPLICATION FILED SEPT. 10, 1917.
1,418,273.
Patented June 6, 1922.
5 SHEETS—SHEET 2.
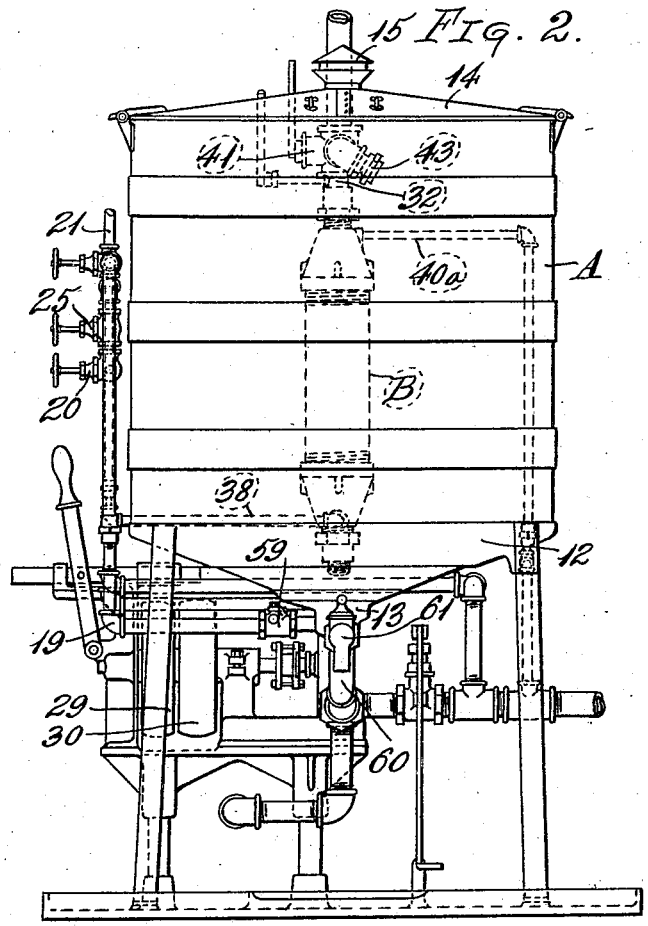
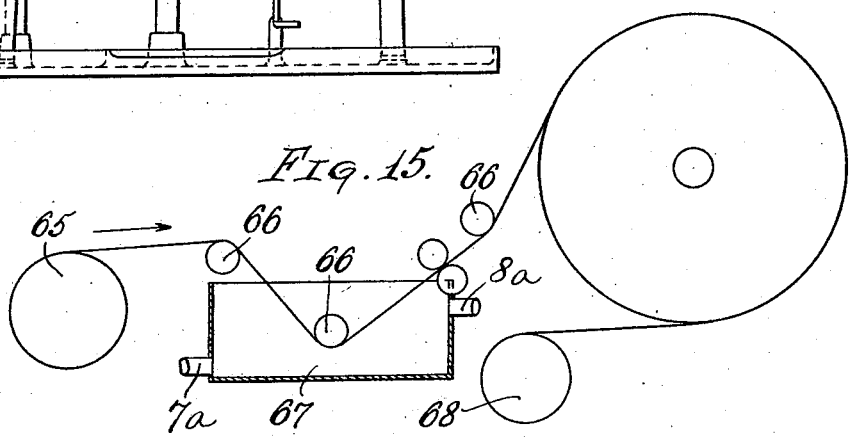

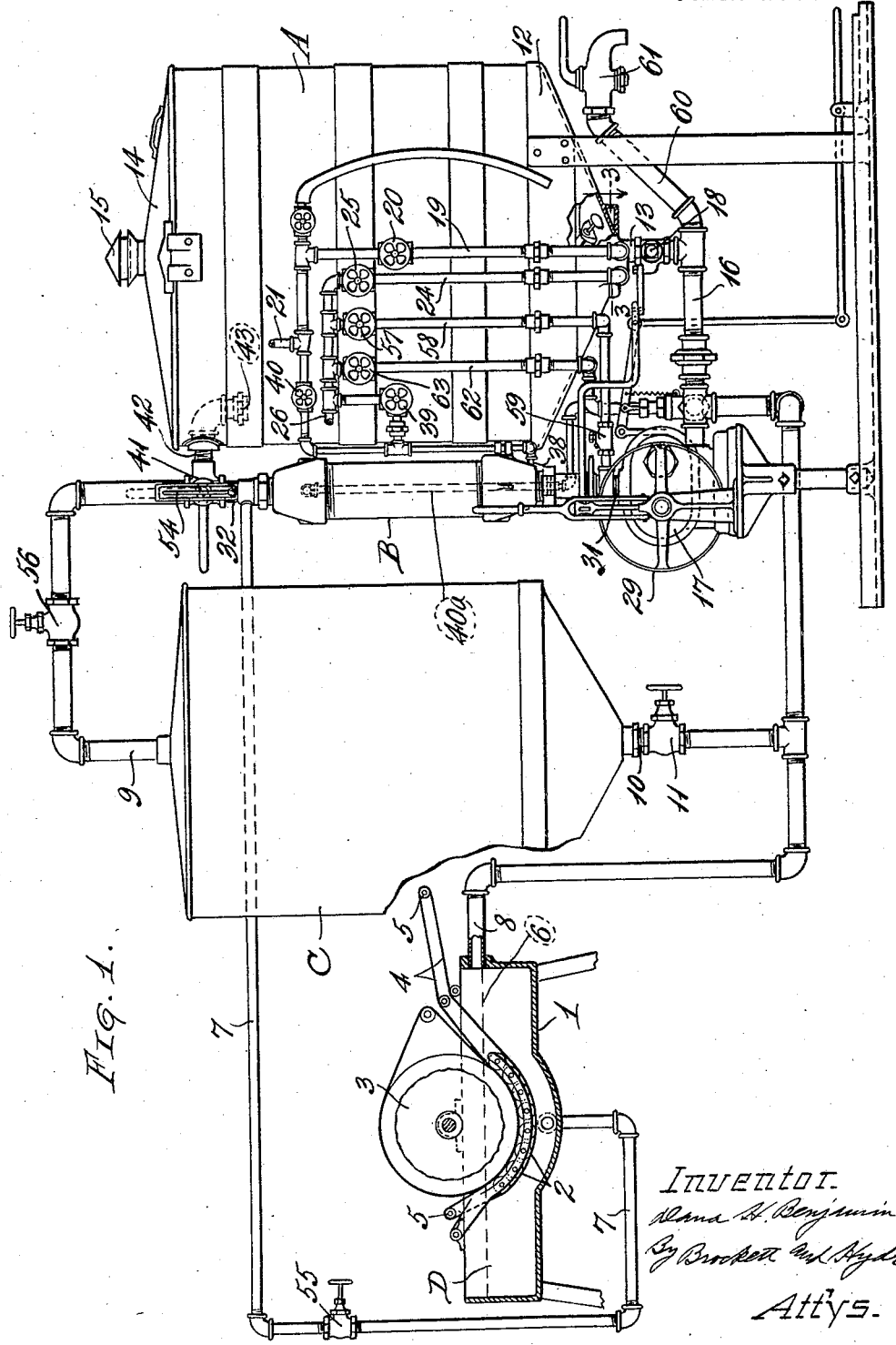

D. H. BENJAMIN.
APPARATUS FOR HANDLING STARCH MIXTURE.
APPLICATION FILED SEPT. 10, 1917.
1,418,273.
Patented June 6, 1922.
5 SHEETS—SHEET 3.
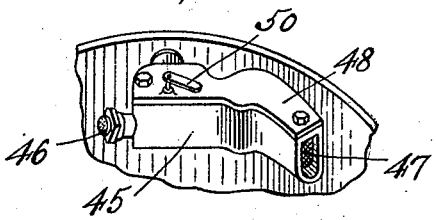
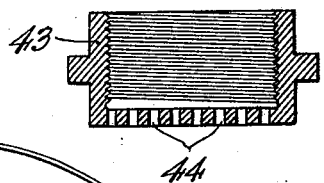
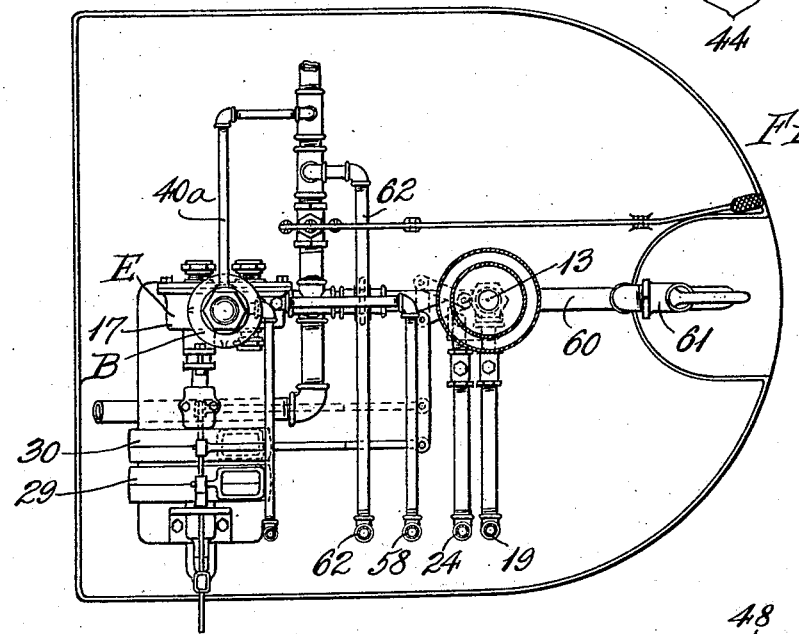
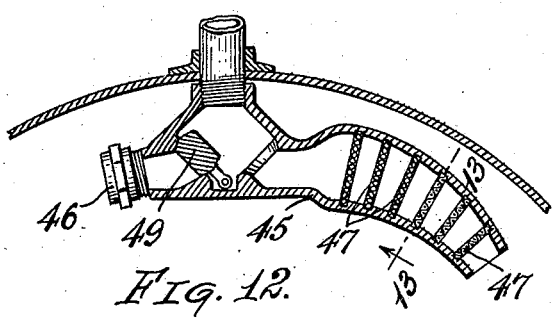
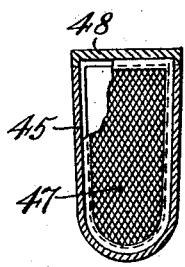

D. H. BENJAMIN.
APPARATUS FOR HANDLING STARCH MIXTURE.
APPLICATION FILED SEPT. 10, 1917.
1,418,273.
Patented June 6, 1922.
5 SHEETS—SHEET 4.
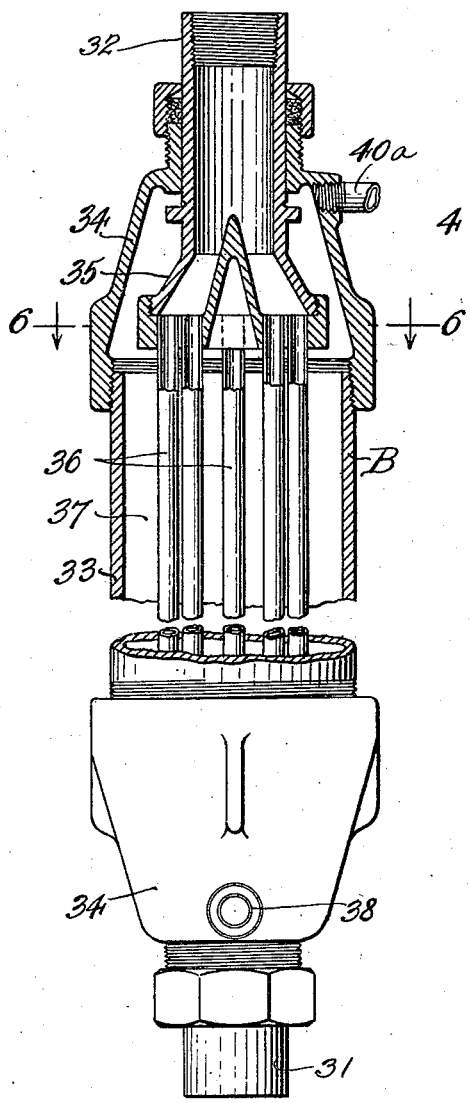
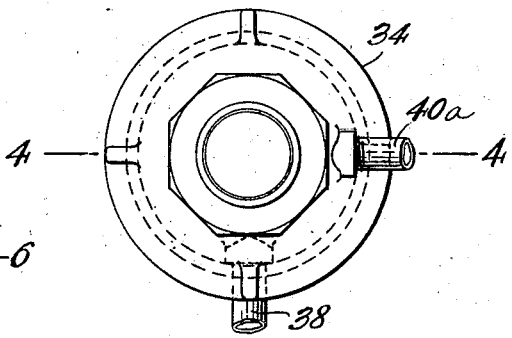
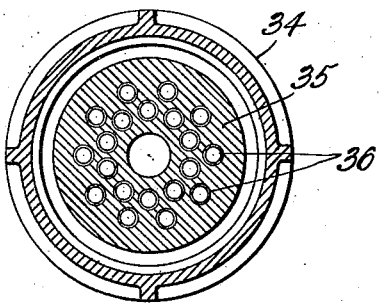
Inventor.
Dana H. Benjamin
By Brockett and Hyde
Attys.

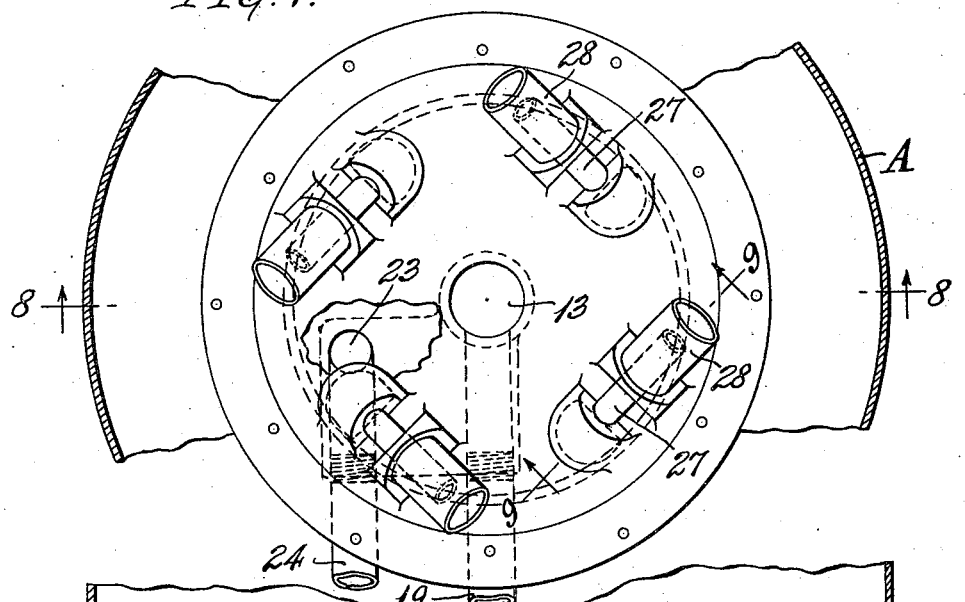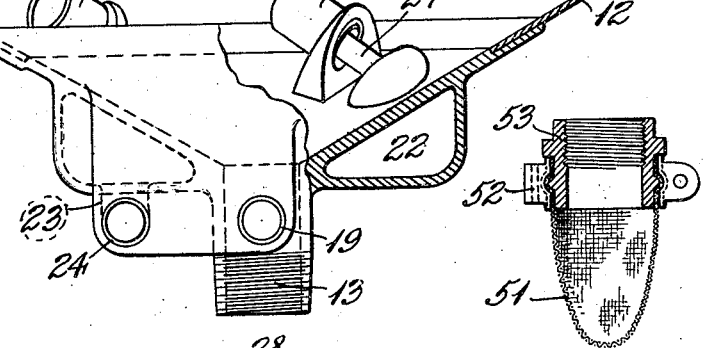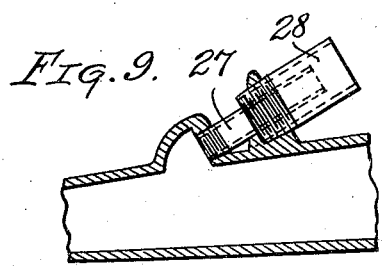

UNITED STATES PATENT OFFICE.

DANA H. BENJAMIN, OF CLEVELAND HEIGHTS, OHIO, ASSIGNOR TO THE AMERICAN LAUNDRY MACHINERY COMPANY, OF CINCINNATI, OHIO, A CORPORATION OF OHIO.

APPARATUS FOR HANDLING STARCH MIXTURE.

1,418,273.      Specification of Letters Patent.     Patented June 6, 1922.

Application filed September 10, 1917. Serial No. 190,676.

*To all whom it may concern:*

Be it known that I, DANA H. BENJAMIN, citizen of the United States, residing at Cleveland Heights, in the county of Cuyahoga and State of Ohio, have invented certain new and useful Improvements in Apparatus for Handling Starch Mixture, of which the following is a specification.

This invention relates to apparatus for handling starch mixture in laundry work, and more particularly to apparatus for preparing the starch mixture and supplying it to a starching machine.

The object of the invention is to provide improved apparatus for handling starch which enables the starch mixture to be properly cooked, mixed and creamed; wherein said mixture can be cooled or heated so as to bring it to any desired temperature; by means of which the mixture can be continuously circulated to and from the starching machine at substantially the desired temperature calculated to produce the best results; wherein the mixture can be creamed or its temperature corrected while circulating it to the starching machine; wherein the circulation of the mixture to and from the mixing and creaming reservoir can be maintained even when the starching machine is not in use.

Further objects of the invention are generally to improve the apparatus and enable laundry work to be starched with a mixture which will produce the best ironing results and with the assurance of maintaining a uniform product.

Further objects of the invention are in part obvious and in part will appear more in detail hereinafter.

In the drawings, which represent one embodiment of the invention, Fig. 1 is a side elevation, partly broken out and in section, illustrating the complete system, the starching machine being conventionally shown; Fig. 2 is a front elevation of the starch mixer and cooker; Fig. 3 is in part a plan view and in part a horizontal section on the line 3—3 Fig. 1; Fig. 4 is in part an elevation and in part a vertical section, on a larger scale, on the line 4—4 Fig. 5, illustrating the temperature correcting device; Fig. 5 is a plan view thereof; Fig. 6 is a cross section on the line 6—6 Fig. 4; Fig. 7 is a plan view of the lower portion of the mixing chamber, illustrating the steam injectors therein; Fig. 8 is in part an elevation thereof and in part a section on the line 8—8 Fig. 7; Fig. 9 is a detail cross section on the line 9—9 Fig. 7; Fig. 10 is a detail cross section of a spraying device; Fig. 11 is a perspective view from the inside, of the upper portion of the mixing tank, and showing a modified form of spraying device; Fig. 12 is a horizontal section thereof; Fig. 13 is a section on the line 13—13, Fig. 12; and Fig. 14 is a detail section, showing another form of spraying and straining device; and Fig. 15 is a diagrammatic view showing another form of starching machine.

The apparatus shown in the drawings comprises a tank or reservoir A in which the starch mixture is mixed, cooked, and creamed, a temperature correcting device B serving to heat or cool the mixture as desired, to give it the proper temperature, a storage reservoir C, a starching machine D, and a pump E for circulating the starch mixture through the various parts of the apparatus, all of said parts being connected up by suitable pipes or conduits as will more fully appear.

The starching machine D requires only a brief description. It may be any suitable machine for applying the starch mixture to any fabric or article to be starched, such as collars, cuffs, shirts or other garments, table linen, or the like. One such machine is shown conventionally in the drawings merely for the purposes of illustration. It comprises a suitable reservoir 1 in which are a series of rollers 2 spaced around the lower portion of a padded rotatable drum 3; 4 represents an apron traveling over the rolls 5, one portion of said apron traveling between the rolls 2 and drum 3 and serving to carry the articles to be starched from one end of the machine down between the rollers and drum and therefore through the starch mixture to the delivery end of the machine. The level of the starch in said reservoir is maintained uniform at substantially the level 6, either by having the supply pipe 7 for delivering the starch mixture to said machine below the level of the discharge pipe 8, or by providing in the supply pipe a valve which is automatically opened and closed by a float in the starch mixture in the same manner as the level of water is maintained in a closet flushing tank, or in any other suitable manner, as will be readily understood.

Fig. 15 illustrates another form of starching machine known as a slasher, for applying starch to warp yarn or threads. These threads are led from a roll 65 over rolls 66 through the starch mixture in a reservoir 67 and thence to the receiving roll 68. The starch mixture flows to the machine through the pipe 7ª and is discharged through pipe 8ª, as in the starching machine before described.

Storage reservoir C is a simple tank, preferably of suitable capacity to hold at one time all, or a large part of the mixture in the entire system. It is provided with a supply pipe 9 and a discharge pipe 10 at its bottom.

Both the starching machine D and the storage reservoir C communicate with the starch preparing tank A and temperature correcting device B, and as the material flowing away from both the starching machine and storage reservoir is conducted to the same point, the discharge pipe 10 from the storage tank may lead directly, by way of a valve 11 to the discharge pipe 8 from the starching machine, although this is not essential.

The mixing and cooking reservoir A may be of any suitable construction or design, but preferably is of the form shown in a prior application of Ernest W. Miller for Starch preparing apparatus, filed Aug. 21, 1916, Serial No. 116074, to which reference may be had for a more complete description of said apparatus, all of the features of which may be employed in the present construction if desired.

As illustrated, said mixing and cooking reservoir comprises a suitable tank having a hopper bottom 12 whose walls converge toward the central opening 13 and whose top is closed by a cover 14 having a vent opening 15 through which steam may escape but which prevents loss of the starch mixture by splashing or spattering. The bottom central opening 13 of the reservoir communicates with two pipes or conduits one of which marked 16, is connected to the suction side of a suitable flow producing device, such as a centrifugal pump 17. In said pipe is a valve 18 which regulates the flow of mixture from the tank to the pump as desired. The return pipe from the starching machine and storage reservoir, or two distinct return pipes one from the starching machine and the other from the storage reservoir if desired, are also connected to the suction side of said pump, preferably communicating with the pipe 16 between the valve 18 and the pump 17. The second pipe communicating with the opening 13, marked 19, is connected by way of a valve 20 to a suitable source of water supply, such as the conduit 21.

The lower portion of the tank surrounding the opening 13 is a metal casing cored out to form a chamber 22 communicating by way of a hollow passage 23 with a pipe 24 having a valve 25 and leading to a source of steam supply, such as the conduit 26, and also with a series of injector nozzles 27 disposed tangentially around the circumference of the tank and inclined upwardly. Each of said nozzles extends partly through a hollow sleeve or tube 28 on the casing, the arrangement producing an injector action at each nozzle causing any mixture in the reservoir to be forced through the tubes 28 with a swirling upward movement along the inner wall of the tank, with a corresponding downward movement of the mixture along the reservoir axis to restore the liquid forced upwardly.

The starch to be used is mixed with water and is introduced into the reservoir, to which additional water is supplied by way of a pipe 19. Valve 25 is then opened to permit steam to flow through the injector nozzles 27 to thoroughly circulate the starch mixture in the reservoir and cook the starch granules, causing them to expand and produce the starch solution, as will be readily understood. By gradually adding the starch to the rapidly circulating heated mixture the starch may be cooked without the formation of lumps or solid matter.

The pump 17 may be of any suitable form and may be driven in any suitable manner. It is illustrated as a rotary centrifugal pump connected to the fast and loose belt pulleys 29, 30. The discharge end of said pump communicates with a pipe 31 leading to the bottom of the temperature correcting device B illustrated in detail in Figs. 4, 5 and 6 and through which the starch mixture flows to the outlet pipe 32.

The upper and lower ends of said temperature correcting device are of substantially identical form. It comprises an outer casing or jacket 33 connecting two heads 34 which are sleeved and packed upon hollow end members 35 connected by the nest of tubes 36 communicating with the pipes 31 and 32 before referred to, so that the starch mixture flows through said pipes 36. The mixture flowing through said pipes may be either heated or cooled to correct its temperature to any desired point by circulating the proper medium through the space 37 within the jacket 33 and surrounding pipes 36. For this purpose the lower head 34 communicates with a pipe 38 connected by way of a valve 39 to the steam conduit 26 and also by way of valve 40 to the water supply pipe 21. The upper head 34 communicates with a pipe 40ª which may lead to the sewer. By opening valve 39 steam may be circulated through the chamber 37 of the temperature correcting device and around the pipes 36 carrying the starch mixture therethrough so as to heat or raise the temperature of said mixture, whereas, by opening valve 40 water may be circulated through said space for cooling the mixture.

The outlet pipe 32 is so arranged as to conduct the starch mixture selectively to one or more of three different places, to wit: into the upper portion of the cooking and mixing chamber to the starching machine, or to the storage reservoir or to any two or more thereof. As illustrated, the outlet pipe 32 communicates by way of a valve 41 with a pipe 42 passing in through the wall of the mixing tank and terminating in a suitable screening or beating device, one form of which is illustrated in Fig. 10 as a hollow cap 43 threaded upon the end of the pipe 42 and provided with a large number of small ports or openings 44 therein.

When the starch solution has been thoroughly cooked and mixed, as above described, the steam supply through the pipe 24 is turned off, the water supply to the chamber 37 of the temperature correcting device around the pipes 36 is turned on and the mixture in the tank is circulated or by-passed from the starch mixer to the cooler and back again. When the solution has been cooled to a temperature low enough so as it will no longer cook the starch, say 130 degrees Fahrenheit, the raw starch to be introduced into the mixture is placed within the mixing chamber. The circulation is then continued for a sufficient length of time to cream the mixture and give it the desired consistency. During all of this time, and in fact at all times when any portion of the apparatus is in use the temperature is maintained fairly closely at the desired point by circulating either water or steam through the temperature correcting device to cool or heat the mixture as may be required.

Figs. 11, 12 and 13 illustrate a modified form of nozzle for delivering the mixture to the mixing tank. It comprises a hollow casing 45 of Y form one of whose branches terminates in a nozzle 46 like that in Fig. 10, while the other branch carries a series of screens 47 held in place by a cap or cover 48. A valve 49 operated by handle 50 enables the mixture to be delivered to either branch. Screens 47 filter the mixture and are useful in mixing the cooked starch before adding the raw starch, to remove lumps. The same result can be secured by the straining device shown in Fig. 14, which is a cloth or fabric bag 51 secured by a ring 52 to a fitting 53 adapted for connection to the pipe 42.

A thermometer 54 may be placed anywhere in the line, for example, at the outlet from the temperature correcting device to indicate the temperature of the mixture. The second branch of the outlet pipe 32 of the temperature correcting device is the pipe 7 communicating with the starching machine D in which pipe is a valve 55, while the other branch of the outlet pipe 32 is the pipe 9 leading to the storage tank C and which pipe includes the valve 56.

When the mixture has been produced and creamed in final form with the proper amount of cooked and raw starch therein, so as to be ready for use in starching fabrics, the valve 55 is opened thereby causing a portion of the mixture to be delivered by the pump to the starching machine. The flow through this pipe is regulated so as to supply sufficient material to maintain in the starching machine a constant level of material flowing through the starching machine in sufficient quantity to produce no material drop in temperature of the mixture therein. The balance of the mixture is delivered into the upper portion of the starch mixer. The pump draws its supply from both the bottom of the starch mixer and also from the starching machine, all of the material being circulated through the temperature correcting device. Consequently by proper manipulation of the valves in the water and steam supplies to the temperature correcting device, the temperature of the mixture delivered to the starching machine may be maintained substantially uniform, at least within very close limits, as only a portion of the material flows through the starching machine and variations in the temperature of that portion of the mixture have little effect upon the larger quantity of mixture flowing through the mixing and cooking reservoir.

It is of course understood that a system of this kind can be utilized for delivering starch mixture to any desired number of independent starching machines, either by circulating the mixture serially or in order through said machines, or by providing an independent pipe for conducting the mixture from the temperature correcting device to each of said machines and then back to the pump.

In starching warp or yarn in a slasher as above described, the starch mixture is circulated to the slasher at a relatively high temperature, say 200 degrees Fahrenheit, and no raw starch is added to the mixture after the first cooking operation. For other classes of work, for example, in starching shirts or collars, the mixture is circulated to the starching machine at a lower temperature, say 100 degrees Fahrenheit, in which case a mixture containing both cooked and raw starch can be used.

If for any reason, it is desired to discontinue operation of the machine the supply thereto can be turned off and the mixture allowed to flow to and through the storage tank C, thereby, in effect, substituting the storage tank for the starching machine without disturbing the relative quantities of mixture circulated through the mixing tank and elsewhere. Also the pipe 9 permits all of the material in the system to be pumped to the storage tank, in which it can be allowed to remain over night or while the rest of the system is cleaned out.

The apparatus is also preferably so arranged as to be self cleaning and draining. For example, the steam supply pipe 26 is connected by way of a valve 57 and pipe 58 to the pipe 31 communicating with the bottom of the temperature correcting device. In the pipe 58 is a non-return check valve 59 seating away from the pipe 31. By opening valve 57 steam may be introduced into the bottom of the temperature correcting device for blowing or cleaning out the starch line and the pipes and tubes in the temperature correcting device. The bottom of the mixing chamber also communicates with a pipe 60, in which is a valve 61. This pipe leads to the sewer and enables the contents of the mixing tank to be discharged thereto. The outlet pipe 40$^a$ which carries the cooling water away from the temperature correcting device may also be connected to this pipe 60, as well as a pipe 62 having a valve 63 communicating with the steam supply pipe 26, which enables any water of condensation to be conveyed to the drain and not circulated through the apparatus.

The apparatus described enables the starch solution to be prepared with the proper composition, temperature and consistency, and enables it to be supplied for use in the starching machine in a manner to produce the best results, and also enables uniform results to be obtained over an extended period.

What I claim is:—

1. Starching apparatus, comprising a starching machine, a reservoir for holding the starch mixture, means for cooking the mixture therein, means associated therewith for correcting the temperature of the mixture, and means for continuously circulating the mixture from the reservoir to the starching machine and back again.

2. Starching apparatus, comprising a starching machine, a reservoir for holding the starch mixture, and means for conducting the mixture from the reservoir to the starching machine and back again, said means including means for creaming the mixture.

3. Starching apparatus, comprising a starching machine, a reservoir for holding the starch mixture, means for continuously circulating the mixture from the reservoir to the starching machine and back again, means for heating the mixture as it flows to the reservoir and means for supplying steam to said reservoir for cooking the starch therein.

4. Starching apparatus, comprising a starching machine, a temperature correcting device adapted to either heat or cool the mixture, and means for continuously circulating the starch mixture between the starching machine and said device.

5. Starching apparatus, comprising a starching machine, a temperature correcting device, and means for continuously circulating the starch mixture between the starching machine and said device comprising means for simultaneously creaming said mixture.

6. Starching apparatus, comprising a starching machine, a reservoir, and a pump having both its inlet and outlet connected to both the reservoir and starching machine.

7. Starching apparatus, comprising a starching machine, a reservoir, a pump having both its inlet and outlet connected to both the reservoir and starching machine, and a creaming device through which the mixture is introduced into said reservoir.

8. Starching apparatus, comprising a starching machine, a reservoir, a temperature correcting device, means for circulating a cooling fluid through said device, means for circulating the starch mixture between said device and the starching machine, and means for conducting the mixture to said reservoir, and means for cooking the same therein.

9. Starching apparatus, comprising a starching machine, a temperature correcting device, means for circulating a cooling fluid through said device, and means for circulating the starch mixture between said device and the starching machine comprising means for creaming the mixture while circulating the same.

10. Starching apparatus, comprising a starching machine, a reservoir, a temperature correcting device at one end connected to both the reservoir and starching machine, and a pump discharging into the opposite end of said device and having its suction side connected to both the reservoir and starching machine.

11. Starching apparatus, comprising a starching machine, a reservoir, means for supplying heating medium to said reservoir for cooking the starch therein, means for supplying water to said reservoir, a creaming device through which the mixture is introduced to said reservoir, and means for circulating the mixture between said reservoir and starching machine.

12. Starching apparatus, comprising a starching machine, a reservoir, a temperature correcting device, and means for circulating the starch mixture through said temperature correcting device and two streams of mixture in parallel through said reservoir and starching machine.

13. Starching apparatus, comprising a starching machine, a storage reservoir, a creaming reservoir, and a pump having both its suction and discharge sides connected to each of said starching machine, storage reservoir, and creaming reservoir.

14. Starching apparatus, comprising a starching machine, a storage reservoir, and a creaming reservoir connected by conduits in parallel, and a temperature correcting device through which the mixture is circulated.

15. Starching apparatus, comprising a starching machine, a storage reservoir, and a creaming reservoir connected by conduits in parallel, a temperature correcting device through which the mixture is circulated, and means for supplying steam to said creaming reservoir for cooking the starch mixture therein.

16. Starching apparatus, comprising a starching machine, a storage reservoir, and a creaming reservoir connected by conduits in parallel, valve means controlling the flow of material through said conduits, and a pump for circulating mixture through any one or more of said starching machine, storage reservoir or creaming reservoir.

17. Starching apparatus, comprising a starching machine, starch cooking and conditioning means, means for continuously circulating the starch mixture through said means and starching machine, and a reservoir communicating with the circulating system.

18. Starching apparatus, comprising a starching machine, a starch mixture circulating system therefor, and starch cooking and conditioning means having a circulation system, said two circulating systems communicating with each other whereby mixture can be made to flow from one system to the other.

19. Starching apparatus, comprising a starching machine, a reservoir for holding the starch mixture, means for cooking the mixture, a pump arranged to circulate the mixture between the starching machine and reservoir, and means for cooking the mixture in said reservoir.

20. Starching apparatus, comprising a starch cooker, a temperature correcting device, a starching machine, and conduits connecting said cooker, device and machine.

In testimony whereof I affix my signature

DANA H. BENJAMIN.